Patented Dec. 21, 1937

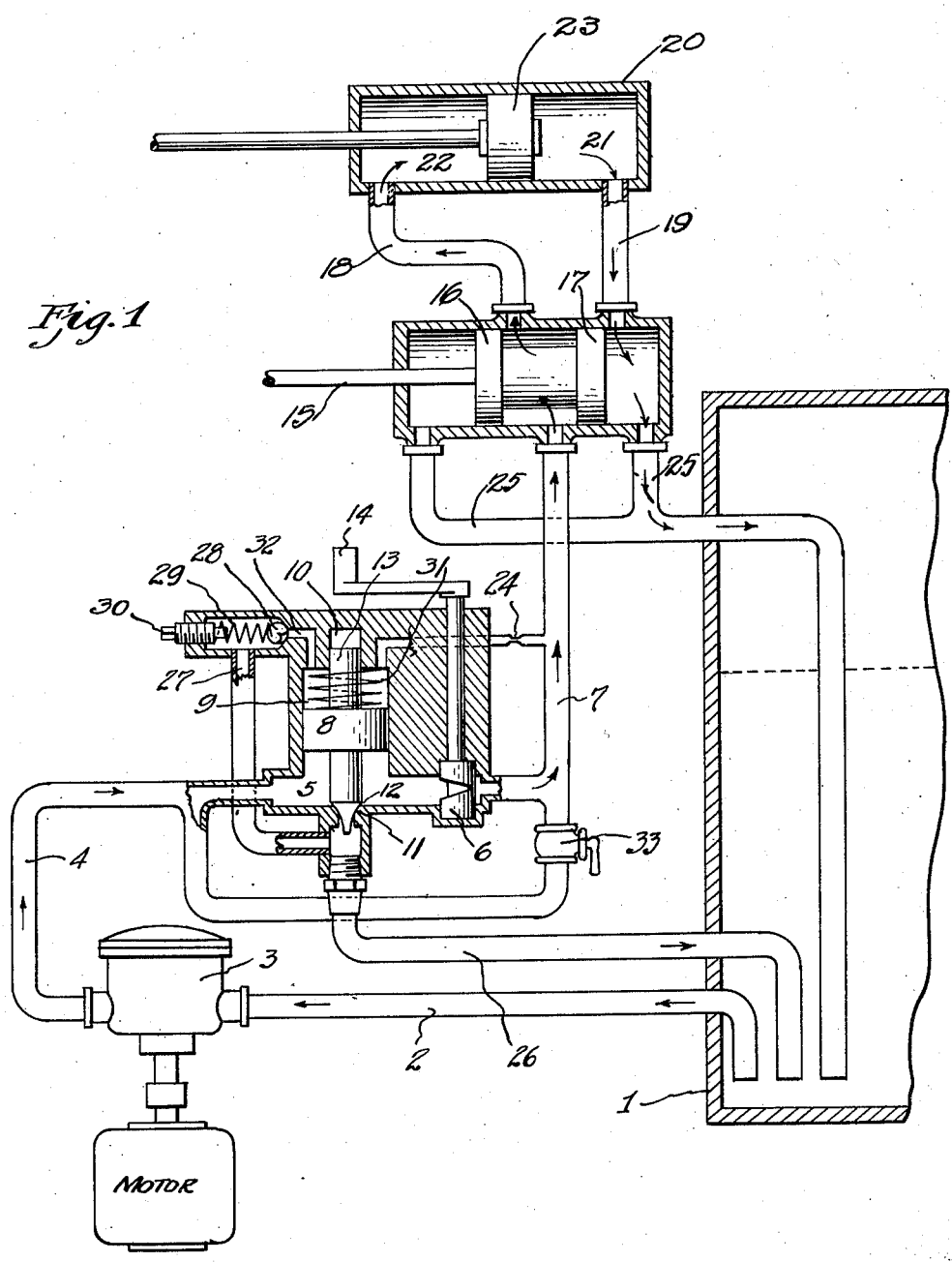

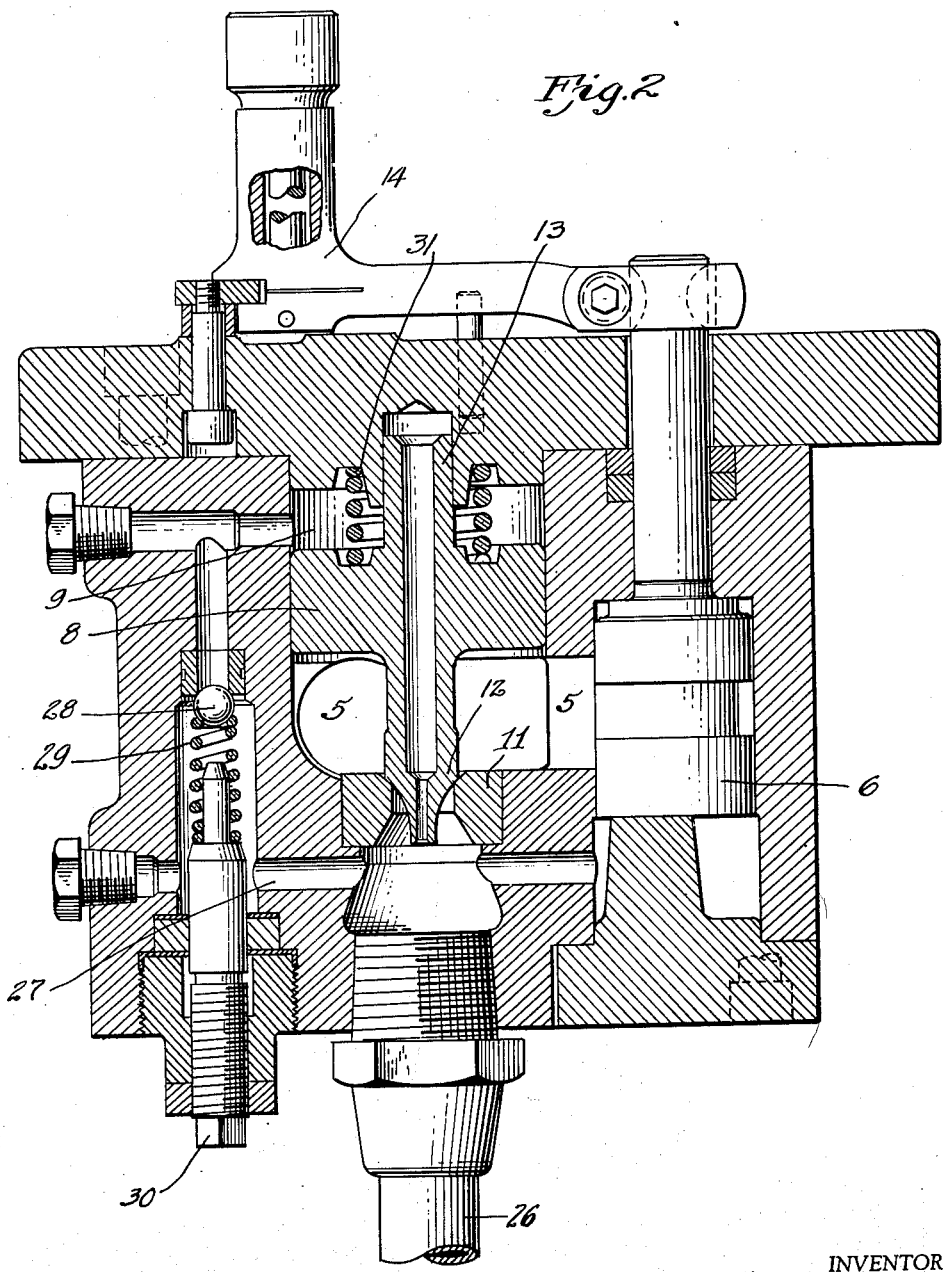

2,102,865

UNITED STATES PATENT OFFICE 2,102,865

COMBINED FLOW CONTROL AND RELIEF VALVE

Harry F. Vickers, Detroit, Mich., assignor to Vickers Incorporated, Detroit, Mich., a corporation of Michigan Application June 20, 1934, Serial No. 731,470

5 Claims. (Cl. 60—52)

This invention relates to a combined flow control and relief valve and has to do particularly with a variable pressure flow control, and overflow and relief valve as a unit in a complete hydraulic circuit.

Heretofore, in hydraulic power transmitting circuits, it has been customary in some instances to utilize a throttle type flow control for regulating or controlling the speed of the liquid-actuated device; in such systems it has been customary to use relief valve structure so designed that the pump would operate continuously at maximum relief valve pressure, regardless of load requirements.

It is an object of the present invention to provide a single unit as a part of a hydraulic power transmitting system, said single unit acting both as a flow control and relief valve and being so constructed and connected into the system that the operating pressure of the supply pump only exceeds by a relatively small amount that pressure required to actually perform the work to be accomplished; thus by combining the flow control and relief valve, it is possible to change what was formerly a fixed pressure system to a variable pressure system.

Another feature of the present invention has to do with a combined flow control and relief valve structure adapted to be so connected up with the operating piston that the flow rate through the operating conduit leading to the piston is constant regardless of the resistance encountered by the operating piston up until the developed resistance exceeds the maximum adjusted pressure of the system.

Other features of the invention include details of construction of the combined flow control and relief valve, embodying particularly such details as permit the single unit to function both as a means of regulating the flow rate to a piston as well as limiting the maximum pressure at which the system can operate.

In the drawings:

Fig. 1 is a somewhat diagrammatic view of a complete liquid circulating system and showing particularly the diagrammatic structure of the combined speed control and relief valve and the manner of connecting the same into the system.

Fig. 2 is a large detail view showing the essential operating parts of my combined flow control and relief valve.

It will be understood that my flow control relief valve may be installed as a unit in many different types of hydraulic circuits, but its actual operation as an efficient unit with respect to the operation of an entire hydraulic system may be best understood when connected into a more or less standard hydraulic circuit, of the type illustrated in Fig. 1.

Following through the illustrated embodiment, as shown in Fig. 1, the operating liquid, preferably oil, may be drawn from the reservoir 1, through a supply conduit 2, by reason of the continuous actuation of a pump 3, which pump is preferably of the constant displacement type, and of a size compatible with the work to be performed. Liquid under pressure may be conducted through a conduit 4 into a chamber 5 of my combined flow control and relief valve, illustrated in detail in Fig. 2. Control of the flow of actuating fluid from the chamber 5 to the member to be actuated is by means of an orifice throttle valve 6.

In order to maintain a constant flow through the orifice valve 6 so that the flow rate from the chamber 5 to the conduit 7 will be constant, regardless of the degree of resistance encountered by the member being actuated, which in turn would cause changes in the required pressure in conduit 7, I have provided a piston 8 the lower part of which, as shown in Fig. 1, defines an upper wall of the chamber 5, and the upper part of which defines the lower wall of chamber 9. A small relief or guide chamber 10 is formed in the casing above the piston 8, and an exhaust valve is provided at the lower end of the piston, comprising a valve seat 11 and a tapered valve member 12. The center of the piston 8 is preferably hollow, as is best shown in Fig. 2. The area of the valve 12 below the piston 8 is substantially balanced by a guide 13, which projects into the chamber member 10. The effective size of the orifice of the valve 6, and hence the volume of liquid passing therethrough is controlled by means of the adjustable lever 14.

Direct application of the liquid under pressure from the combined flow control and relief valve, is by means of a conventional type four-way valve, having a piston rod 15 and double pistons 16 and 17 co-operating with conduits 18 and 19 to direct the liquid under pressure to one end or the other of cylinder 20 and into chambers 21 or 22 that control the movement of the piston 23. Exhaust liquid from the cylinder 20 is conducted away by either the conduits 18 or 19, through the four-way valve and relief conduits 25, to the tank.

A relatively restricted conduit 24 connects the operating pressure in the conduit 7 with the chamber 9 above the piston 8. Relative pressures on either side of the piston 8 determine the flow of liquid under pressure entirely through the orifice valve 6, or partly or substantially entirely through the outlet valve 11. A pressure relief valve or ball 28, backed by a predetermined strength spring 29, variable by adjusting means 30, controls the flow of liquid through passageway 32, which is a relatively large passageway compared to the restricted passageway 24. An auxiliary exhaust conduit 27 connects the chamber surrounding the spring 29 with the main exhaust conduit 26.

Obviously the movement of the piston 23 may be maintained at a constant rate of speed for its entire stroke, corresponding to a given setting of the orifice valve 6, or the speed of such piston may be changed at any point of its movement by movement of the handle 14, either manually or automatically. Rapid return, or partial rapid return or rapid approach, may be accomplished by temporarily bypassing the liquid under pressure around the speed control and relief valve and through bypass valve 33.

Following through the operation of the entire circuit; in the position of the four-way valve, as shown in Fig. 1, liquid under pressure is admitted through conduit 18, thence to chamber 22, causing travel of the piston 23 to the right. Exhaust liquid from the chamber 21 of the cylinder 20 will pass through conduit 19 and out through conduit 25 to the reservoir. In order to maintain a constant flow through the orifice valve 6, so that the flow rate from the chamber 5 to conduit 7 will be constant, regardless of the resistance encountered by the piston, which in turn would cause changes in the required operating pressure from conduit 7, piston 8 is arranged to actuate valve 12 in relation to its seat 11, whereby to maintain a constant differential or pressure drop between said chamber 5 and conduit 7, regardless of any changes in pressure in such conduit 7.

The amount of pressure drop across the valve 6 is controlled by the stiffness of spring 31. Assuming spring 31 to have the value of eighteen pounds per square inch area of the piston 8 exposed to chamber 5, it is obvious that if the pressure in conduit 7 is zero, a pressure of eighteen pounds per square inch must exist in chamber 5 before the upward thrust on piston 8 will overcome the spring 31, at which point such piston 8 would move upwardly and exhaust excess oil through the valve seat 11 and conduit 26, to the reservoir 1. The diameter of the guide 13 is preferably slightly smaller than the diameter of the valve 12, so that under normal conditions the tendency is to hold the valve 12 on the valve seat 11; however, sufficient efficiency can be obtained by having the effective areas of guide 13 and the piston 12 substantially equal.

Again assuming a pressure of a hundred pounds per square inch existed in conduit 7, during a certain part of the working movement of the piston, this pressure would be delivered or transmitted into the chamber 9 by the restricted conduit 24, and would assist the spring 31 in maintaining the valve 12 in contact with its seat 11. Under these conditions a pressure of one hundred eighteen pounds per square inch would have to exist in chamber 5 before the piston 8 could overcome the pressure of one hundred pounds in the chamber 9 plus the eighteen pounds pressure of spring 31. Any tendency of the pressure in chamber 5 to increase would consequently allow oil to exhaust through passage 26 to the reservoir. It will also be seen under these conditions that the pressure drop across the orifice valve 6 is still eighteen pounds per square inch or equivalent to the strength of the spring 31.

It will be seen, therefore, that the pressure in conduit 7 and chamber 5 can rise as required to fulfill the operating conditions surrounding the piston 23, but the pressure in chamber 5 will always remain eighteen pounds greater than that in conduit 7 until such time as the pressure in conduit 7, communicated through restricted passage 24, chamber 9, and enlarged passage 32, is sufficient to overcome the spring 29 and unseat the relief ball 28. When this predetermined pressure is reached, oil can be exhausted through the relief ball 28 and conduit 27 more rapidly than it can be replaced through the restricted conduit 24, and this action will limit the maximum pressure which can exist in chamber 9. Therefore, any increase in pressure in the conduit 7, or the chamber 5, over and above the established maximum pressure of the system, results in a greater upward thrust on the piston 8, thus permitting the entire pump volume to be exhausted directly through the seat 11 and the conduit 26, to the tank. It will be seen that the restriction 24 operates in true combination with the valve 28 and chamber 5; when a rise in pressure in chamber 9 is sufficient to open valve 28 the restriction prevents liquid in the line from going through the chamber 9 and around through the conduit 27; in addition the restriction has a dampening and non-chattering action on the liquid.

Thus the stiffness of the spring 29, being adjustable by the screw 30, provides means for adjustably limiting the maximum pressure which can exist in the system. It is therefore, evident that this single unit functions both as a means of regulating the flow rate to the piston 23, as well as limiting the maximum pressure at which this system can operate. This flow rate through the conduit 7 is constant, regardless of the resistance encountered by piston 23, up until this resistance exceeds the maximum adjusted pressure of the system. However, what is probably of more importance, is the fact that the pump 3 does not operate continuously at the predetermined maximum relief valve pressure determined by spring 29, but on the contrary, the operating pressure of the pump 3, and of course, the operating pressure in chamber 5, will exceed by a very small amount (substantially the pressure of the spring 31), that pressure required to actually overcome the resistance of piston 23. Thus, the combination of the combined flow control and relief valve with the remainder of the system has provided a simple, compact and variable system with enormous advantages in pump efficiency and reduction of wear and replacement costs.

What I claim is:

1. In a hydraulic power transmitting system, the combination of a work member shiftable by liquid under pressure, a constant displacement pump, a reservoir, and a combined pressure flow control and relief valve unit connected in between said pump and work member, means for directing the liquid from said pump to and from said work member to control the directional operation thereof, said valve unit including a chamber for receiving liquid under pressure from said pump, a variable orifice valve member positioned between said chamber and operating line to said work member, and piston valve means forming an integral part of said unit and having a valve connected to said reservoir and a piston having one effective surface and hydraulically connected to one side of said orifice valve member and another surface connecting the pressure line to the work member for simultaneously maintaining the flow rate to said work member and varying the operating pressure in said chamber proportionately to the actual pressure required to overcome the resistance of the work member for regulating and maintaining the flow rate to said work member to predetermine and then maintain the speed of said work member at any part of its movement, and maximum pressure relief means connecting one side of said piston to the reservoir and actuated by relative pressure on opposite sides of said piston to determine the flow of liquid entirely through said orifice valve or at least partly past said piston valve.

2. In a hydraulic power transmitting system, the combination of a work member shiftable by liquid under pressure, a constant displacement pump, a reservoir, and a combined pressure flow control and relief valve unit connected in between said pump and work member, said valve unit comprising a chamber for receiving liquid under pressure from said pump, a variable orifice valve member positioned between said pressure chamber and the operating line to said work member, an exhaust conduit leading from said chamber to said reservoir, a piston in said unit having a valve portion extending through said chamber and cooperating with said exhaust conduit to control the flow of liquid from said pressure chamber to said reservoir, a chamber formed in the valve housing above said piston, a relatively restrictive conduit connecting the pressure line to the work member with said last named chamber, a relatively large conduit leading from said second named chamber and connecting with said reservoir, and an adjustable relief valve positioned in said relatively large conduit and operating in combination with said piston valve and exhaust conduit to additionally control the flow of liquid from said chamber to said reservoir.

3. A combined flow control and relief valve for use with constant displacement pumps, comprising a unit housing, a chamber in said housing for receiving a pressure supply, an exhaust line leading from said chamber to a work member, a regulable orifice in said line, a relief orifice leading from said chamber, a substantially balanced piston valve having a portion extending through said chamber and acting as a control valve for said relief orifice, a spring acting on said piston valve to determine the pressure differential across said orifice valve, a conduit having a restricted orifice leading from the work line into the spring pressed side of said piston, and a maximum relief control connected into the spring pressed side of the piston valve to effect relief through the relief orifice of pressure above that predetermined by the relief control.

4. In a hydraulic power transmitting system, the combination of a work member shiftable by liquid under pressure, a constant displacement pump, a reservoir, and a combined pressure flow control and relief valve unit connected in between said pump and work member, means for directing the liquid from said pump to and from said work member to control the directional operation thereof, said valve unit including a chamber for receiving liquid under pressure from said pump, a variable orifice valve member positioned between said chamber and operating line to said work member, and piston valve means forming an integral part of said unit and having a valve connected to said reservoir and a piston having one effective surface and hydraulically connected to one side of said orifice valve member and another surface connecting the pressure line to the work member for simultaneously maintaining the flow rate to said work member and varying the operating pressure in said chamber proportionately to the actual pressure required to overcome the resistance of the work member for regulating and maintaining the flow rate to said work member to predetermine and then maintain the speed of said work member at any part of its movement, and maximum pressure relief means connecting one side of said piston to the reservoir and actuated by relative pressure on opposite sides of said piston to determine the flow of liquid entirely through said orifice valve or at least partly past said piston valve, and means for temporarily bypassing said unit to obtain rapid movement of said work member during a portion of its cycle.

5. A combined flow control and relief valve for use with constant displacement pumps, comprising a unit housing, a chamber in said housing for receiving a pressure supply, an exhaust line leading from said chamber to a work member, a regulable orifice in said line, a relief orifice leading from said chamber, a substantially balanced piston valve having a portion extending through said chamber and acting as a control valve for said relief orifice, a spring acting on said piston valve to determine the pressure differential across said orifice valve, a conduit having a restricted orifice leading from the work line into the spring pressed side of said piston, and a maximum relief control connected into the spring pressed side of the piston valve to effect relief through the relief orifice of pressure above that predetermined by the relief control, the actuation of said relief valve being subject to relative pressures on opposite sides of the said piston to determine the flow of liquid under pressure entirely through the regulable orifice, or at least partly through said relief orifice.

HARRY F. VICKERS.